United States Patent [19]

Kroell

[11] Patent Number: 4,606,494

[45] Date of Patent: Aug. 19, 1986

[54] METHOD OF WELDING DISCS TO A SPLIT HUB ASSEMBLY

[76] Inventor: Franz Kroell, 13405 NW. Greenwood Dr., Portland, Oreg. 97229

[21] Appl. No.: 815,631

[22] Filed: Jan. 2, 1986

Related U.S. Application Data

[62] Division of Ser. No. 676,499, Nov. 29, 1984.

[51] Int. Cl.$^4$ .............................................. B23K 31/02
[52] U.S. Cl. .................................... 228/182; 228/213; 29/157.4
[58] Field of Search ...................... 228/182, 213, 49.3, 228/173.6; 29/157.4

[56] References Cited

U.S. PATENT DOCUMENTS

| 2,349,792 | 5/1944 | Rosenblad | 285/192 X |
| 2,368,403 | 1/1945 | Barnes | 228/183 X |
| 2,615,414 | 10/1952 | Adams et al. | 228/49.3 X |
| 3,306,441 | 2/1967 | Sanders | 209/672 |
| 4,037,723 | 7/1977 | Wahl | 209/672 |
| 4,239,119 | 12/1980 | Kroell | 209/672 |
| 4,301,930 | 11/1981 | Smith | 209/672 |

Primary Examiner—Kenneth J. Ramsey
Attorney, Agent, or Firm—Klarquist, Sparkman, Campbell, Leigh & Whinston

[57] ABSTRACT

A disc separator includes discs welded to a hub. Each disc has an extruded collar disposed around a central aperture through which the hub extends. The collar provides bending rigidity to the disc and is interposed between the disc and hub to insulate the disc from thermal stresses caused by welding. The hub has an open seam and an initial diameter less than the diameter of the central aperture of the discs. The discs are assembled on the hub by sliding each of them to a predetermined position on the hub, expanding the hub, welding the collar to the hub, and relaxing the hub. The steps are repeated until a plurality of discs are securely welded to the hub to form a disc assembly.

3 Claims, 5 Drawing Figures

METHOD OF WELDING DISCS TO A SPLIT HUB ASSEMBLY

This is a division of application Ser. No. 676,499, filed Nov. 29, 1984.

BACKGROUND OF THE INVENTION

This invention relates to an improved disc separator and more particularly, to an improved disc assembly within the separator and to a method of making such a disc assembly.

Disc separators are used in wood products and other industries for screening large flows of material such as wood chips to separate larger chunks of material from finer pieces. A separator usually comprises a plurality of disc assemblies mounted in parallel for rotation in the same direction to form a moving screen. Each disc assembly includes a hub and a row of parallel discs mounted thereon. The discs of adjoining assemblies interleave with a narrow spacing that permits only the finer material to pass through the slots between the discs. The larger chips screened out are carried by the rotating discs to the discharge end of the screen.

A long-standing problem with disc separators has been the difficulty of maintaining uniformity of spacing between the discs. Slot widths between overlapping discs may be as little as 1/5 inch. Even a slight misalignment of a disc from the parallel can vary the slot width arbitrarily and allow unacceptable chips through the screen. Furthermore, the misalignment can also cause overlapping discs to rub against each other and quickly wear out.

Heretofore, the discs have been secured to a hub by a number of different methods. In U.S. Pat. No. 4,037,723 to Wahl et al. and in my own U.S. Pat. No. 4,239,119, the discs are splined onto the hub and spaced apart in parallel by intervening spacers. Although the discs may be uniformly spaced using this approach, they are not securely fastened to the hub at their bases to prevent the discs from wobbling. The only force holding the discs in alignment is compression from plates on the ends of the hub. Moreover, the planar surface of the disc has little rigidity and bends when pressured by large wood chips that can wedge between overlapping discs.

An alternative method for fastening discs to the hub is disclosed in U.S. Pat. No. 4,301,930 to Smith. Rather than relying on spacers or spline slots to align the discs closely to one another, the discs are welded at their bases directly to the hub. The welding, however, does not provide any further rigidity to the disc surface. Furthermore, welding the disc directly to the hub has its own drawbacks. It introduces thermal stresses to the metal of a disc that can warp the planar surface and thus cause the spacing between discs to vary.

Therefore, a need remains for a disc assembly having the discs securely mounted to the hub for proper alignment and for a method of making such a disc assembly.

SUMMARY OF THE INVENTION

It is an object of the invention to provide an improved disc assembly having discs welded to the hub.

It is a further object of the invention to provide each disc with a collar disposed around the central aperture of the disc for increasing the bending rigidity of the disc's surface and improving its alignment with adjacent discs.

It is another object of the invention to protect the discs from thermal stresses caused by welding by interposing a collar between the disc and the hub to which it is welded.

It is still another object of the invention to provide a method for securely welding discs to a hub without misaligning the discs.

The foregoing and other objects, features, and advantages of the invention will become more apparent from the following detailed description of a preferred embodiment which proceeds with reference to the accompanying drawings.

DETAILED DESCRIPTION

Figure 1:
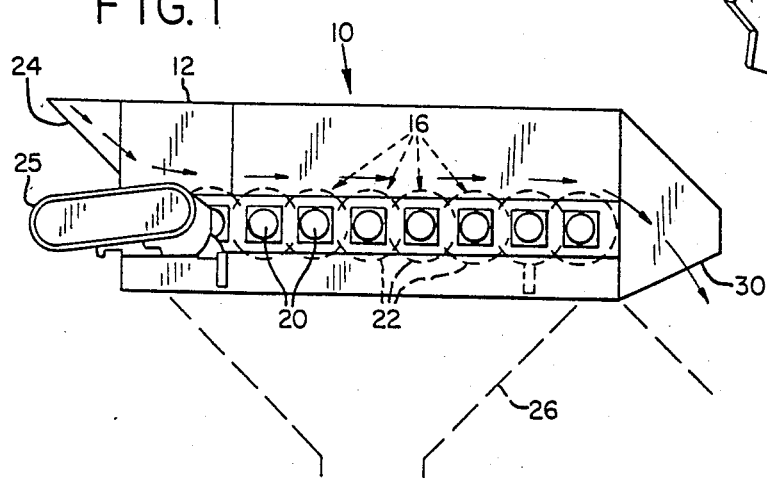
FIG. 1 is a simplified end view of a disc separator having a plurality of disc assemblies.
Figure 2:
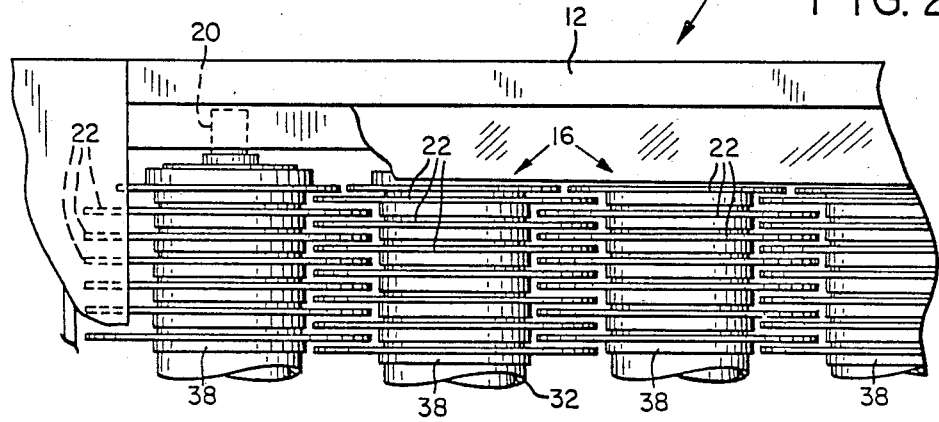
FIG. 2 is a fragmental top plan view to larger scale of the disc separator of FIG. 1.

Referring now in detail to the drawings, FIGS. 1 and 2 show a disc separator 10. The separator 10 includes a box-like frame 12 and a plurality of rotatable disc assemblies 16 supported within the frame. Each assembly 16 has a row of parallel discs 22 and is mounted on a shaft 20 for rotation in the same direction. The shafts are mounted in parallel planar relation and spaced closely enough that adjacent assemblies have interleaving discs 22 separated by a fine spacing. The assemblies 16 thus form a moving screen.

Material to be separated is dumped into an entrance chute 24 of the separator 10 and carried along by the rotating assemblies 16 which are powered by drive means 25. The finer material passes between the discs into a chute 26. The larger material that cannot fit between the discs is carried beyond to a discharge end 30 for further processing.

Figure 4:
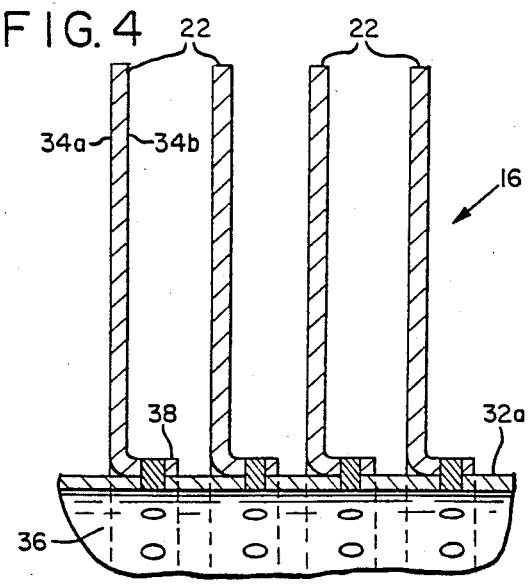
FIG. 4 is a sectional view of a disc assembly according to the invention.

Referring to FIG. 4, each assembly 16 comprises multiple annular discs 22 mounted concentrically in axially spaced relation on a hub 32. Each disc has opposed planar surfaces 34a, 34b and a central aperture 36 through which the hub 32 extends. A collar 38 is disposed on the disc around the aperture 36 and is welded to the hub 32 to mount the disc 22 securely thereto.

The collar 38 provides the disc 22 with bending rigidity that would otherwise be absent. Without such support, the planar surfaces would have a tendency to bend and warp. The collar 38, being interposed between the disc and the hub 32, also serves to insulate the disc from thermal stresses caused by welding. Intense heat can warp and misalign a disc if it is welded directly to the hub.

The disc 22 is formed by a blanking die which punches the aperture 36 in the metal. The collar 38 is formed by extrusion from the disc itself using a piloted mandrel. This ensures that each collar is formed with a very accurate inside diameter which permits the collar to be securely fastened to the disc.

Figure 3:
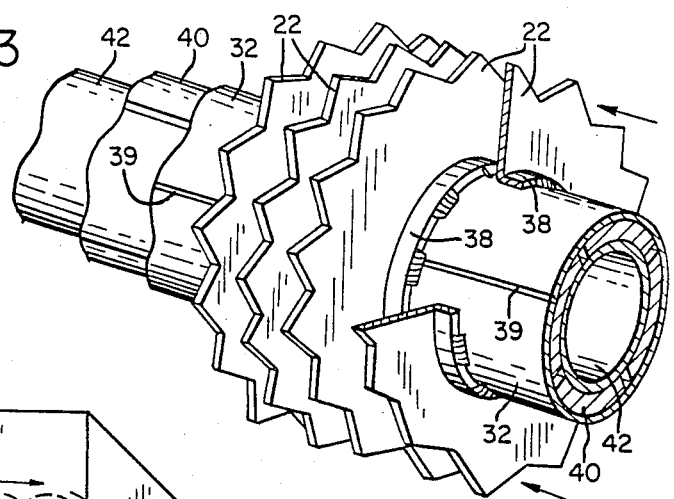
FIG. 3 is a fragmentary perspective view of the disc assembly including the assembly used to make it.

Discs 22 may be circular but are preferably toothed or star-shaped as shown in FIG. 3 to carry the material lengthwise of separator 10. As the material passes over the discs, the smaller fragments fall freely between them and the larger particles are carried to the discharge end 30.

The discs may be secured to hub 32 to make disc assembly 16 by the following method. Hub 34 is made having a predetermined initial inner and outer diameter and is provided with an open seam 39 running its length. The seam allows hub 32 to expand in diameter. The initial outer diameter is less than the inner diameter of the collar 38 so that the hub can easily extend through the collar.

A first disc 22 is then slid over the hub to a predetermined mounting position. The disc is slid over the hub with surface 34a leading and collar 38 trailing to facilitate the subsequent welding of the collar to the hub.

With the disc in place, the outer diameter of hub 32 is expanded to meet the inner diameter of collar 38. The collar is then welded to the hub at the predetermined position. The welding may take different forms, such as the spot welds shown in FIG. 4 or the continuous weld shown in FIG. 5.

The outer diameter of hub 32 is then relaxed so that the unwelded portion of the hub returns to its initial diameter. A second disc 22 is then slid onto hub 32 adjacent the first disc and the steps of expanding the hub, welding it to the collar, and relaxing the hub to receive another disc are repeated. The process continues until the desired number of discs are securely welded to the hub.

A method of expanding the hub 32 is shown in more detail in FIG. 3. An expandable mandrel 40 is provided having an initial outer diameter less than the predetermined initial inner diameter of the hub. An inflatable air bag 42 is provided within mandrel 40. To expand the hub, the mandrel and the air bag are inserted within the hub and the air bag is inflated. As the air bag 42 expands, it presses against mandrel 40 causing it to expand and thereby expand the hub 32. Mandrel 40 is of a sufficient insulating character to shield air bag 42 from the heating caused by the welding.

The air bag 42 is deflated to relax the diameter of the hub after each welding of a collar 38 to the hub 32. As the air bag is deflated, mandrel 40 relaxes to its initial outer diameter, thereby allowing hub 32 to relax toward its initial diameter.

Figure 5:
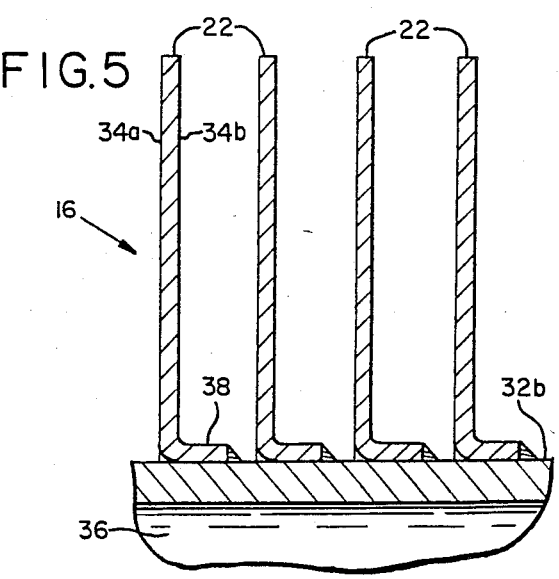
FIG. 5 is a sectional view of another embodiment of a disc assembly according to the invention.

Hub 32 may be either thin walled or thick walled, depending upon the type of shaft 20 to which the hub is mounted. For an assembly that includes a shaft that extends completely through the hub, a thin-walled hub 32a is used, as shown in FIG. 4. For an assembly that comprises stub shafts secured to the ends of a hub, a thick-walled hub 32b is used, as shown in FIG. 5.

Having illustrated and described the principles of the invention in a preferred embodiment, it should be apparent to those skilled in the art that the invention can be modified in arrangement and detail without departing from such principles. I claim all modifications coming within the spirit and scope of the following claims.

I claim:

1. A method of making a disc assembly for a disc separator comprising the following sequential steps:

providing an expandable hub having an open seam, the hub having a predetermined initial inner and outer diameter;

providing a plurality of annular discs, each of the discs having an extruded collar around a central aperture, the inner diameter of the collar being greater than the predetermined initial outer diameter of the hub;

sliding a first one of the discs onto the hub to a predetermined mounting position;

expanding the outer diameter of the hub to meet the inner diameter of the collar of the disc;

welding the collar of the disc to the hub at the predetermined position;

relaxing the outer diameter of the hub; and sliding another of the discs onto the hub adjacent the first disc and repeating the steps of expanding, welding, and relaxing until a plurality of discs are welded to the hub.

2. A method as in claim 1 wherein the expanding of the diameter of the hub comprises:

providing an expandable mandrel of an initial outer diameter less than the predetermined initial inner diameter of the hub;

providing an air bag to fit within the mandrel;

sliding the mandrel within the hub; and inflating the air bag to expand the mandrel and thereby the diameter of the hub.

3. A method as in claim 3, wherein the relaxing of the diameter of the hub comprises deflating the air bag to relax the mandrel and thereby the hub.

* * * * *

UNITED STATES PATENT AND TRADEMARK OFFICE
CERTIFICATE OF CORRECTION

PATENT NO. : 4,606,494

DATED : August 19, 1986

INVENTOR(S) : Franz Kroell

It is certified that error appears in the above-identified patent and that said Letters Patent is hereby corrected as shown below:

Column 4, claim 3, line 1, "3" (second occurrence) should be --2--.

Signed and Sealed this

Twenty-fifth Day of November, 1986

Attest:

DONALD J. QUIGG

Attesting Officer      Commissioner of Patents and Trademarks